May 31, 1966     E. J. JOHNSTON ETAL     3,253,395

RAKE TOOTH CONSTRUCTION WITH REPLACEABLE TINE

Filed Oct. 8, 1964

Inventors:
Edward J. Johnston
Frank J. Macha, Jr.

By: John J. Kowalik
Atty.

United States Patent Office 3,253,395
Patented May 31, 1966

3,253,395
RAKE TOOTH CONSTRUCTION WITH
REPLACEABLE TINE
Edward J. Johnston, La Grange, and Frank J. Macha, Jr., Chicago, Ill., assignors to International Harvester Company, Chicago, Ill., a corporation of New Jersey
Filed Oct. 8, 1964, Ser. No. 402,432
4 Claims. (Cl. 56—400)

This invention relates to farm implements. Particularly it relates to rakes and the like. Specifically it relates to a rake tooth construction adapted for use in a side-delivery rake or equivalent implement.

A conventional rake comprises a rake bar on which there are mounted or to which there are connected a plurality of depending rake teeth comprising tines. A side-delivery rake is a device adapted to mave hay and the like into windrows which are parallel to the path of movement of and to one side of a vehicle which carries and supports the rake bar. For that purpose, a rake bar is generally disposed at an angle from the perpendicular of the path of movement of the vehicle carrying the rake bar. Furthermore, it is continuously power driven by a rotary mechanism in an eliptical path into and out of engagement with crop which is being raked to side deliver or drive such crop into the windrows.

The rotary mechanism which drives a rake bar causes it to rise and fall in its path of movement to bring tines mounted thereon into repeated engagement with the ground. Furthermore, during a portion of the course of movement of the rake bar, it frequently occurs that the tines be drawn across the ground surfaces. Accordingly, rake teeth are subjected to wear resulting from erosion and jolting which occur in normal usage.

Conventionally a rake tooth is individually releasably connected to a rake bar, whereby individual teeth may be replaced. For connection to a rake bar, an inner end portion of each tooth comprises a connector generally referred to as a clip. Conventionally, a clip may comprise a metal component which can be releasably bolted to a rake bar. A resiliant block fabricated from rubber or other elastomer material, which may be bonded or otherwise connected to the metal clip, itself forms a link between the inner end portion of a metal tine and the clip. A variation in conventional mountings for a rake tooth is provided by a clip in which a rubber or elastomer block is removably carried, with the inner end portion of a tine rigidly secured or bonded in the block.

It is apparent from the foregoing that when only a portion of a conventional rake tooth is damaged, more than merely the damaged portion will require replacement. Employing one conventional construction, an entire clip and block together with its tine will require replacement. Employing another, the rubber or elastomer block together with its tine will require replacement. In any regard, when employing prior devices, should replacement of a tine be indicated by reason of wear or damage to an outer end portion of such tine, the entire tine together with either its whole or a portion of its mounting or linkage to the rake bar must be replaced, notwithstanding that the mounting is in good repair.

Accordingly, it is a primary and general object of the instant invention to provide an improved rake tooth construction.

It is an additional object of the instant invention to provide a rake tooth construction having means for releasably connecting a rake tooth to a rake bar and having a replaceably or releasably mounted tine.

A yet further object of the instant invention is the provision of a rake tooth which includes a clip or connector releasably mountable upon a rake bar and including a resilient portion in which there is securely anchored a permanent tine holder and a replaceable tine releasably connected to the permanent tine holder.

The foregoing and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:
FIG. 1 is a vertical sectional view through a rake bar and a rake tooth embodying one form of the invention and showing a replaceable tine in elevation with parts broken out to conserve drawing area.

Figure 1:
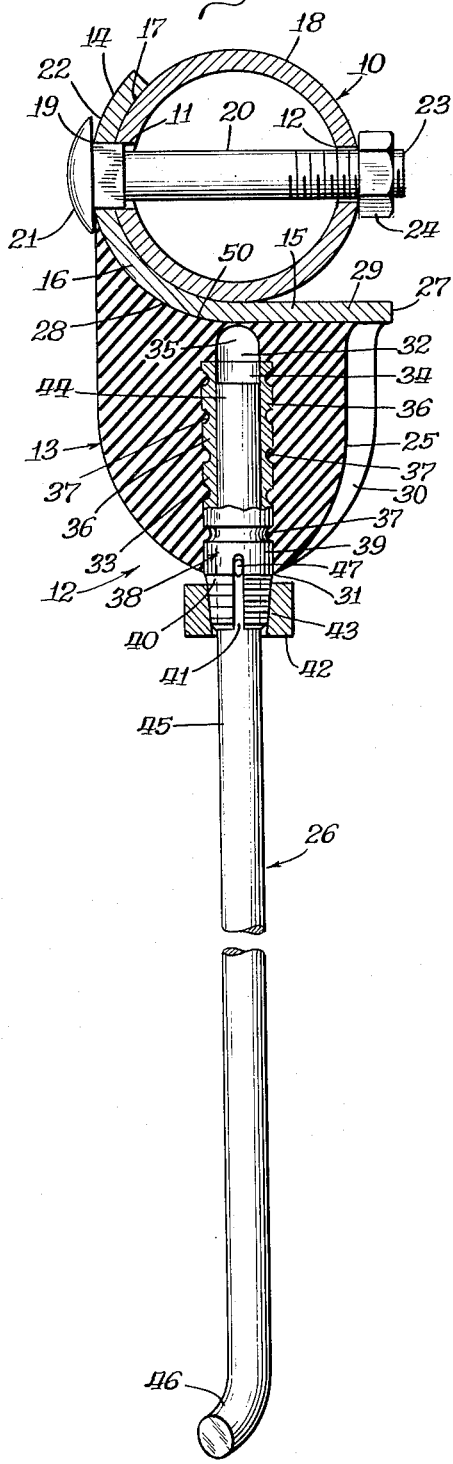
Figure 2:
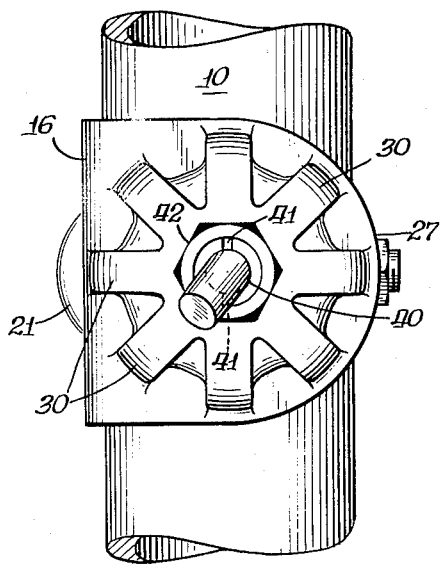
FIG. 2 is a view of a section of the rake bar looking upwardly from the bottom of FIG. 1.
Figure 3:
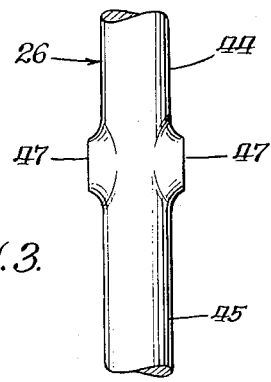
FIG. 3 is an elevational view of a section of the replaceable tine.

Referring now more particularly to the drawings, in FIGS. 1 and 2 there is illustrated an elongated rake bar 10 of a type adapted to be mounted on a power driven farm vehicle (not shown). Rake bar 10 may be of circular tubular construction and metallic fabrication in accordance with conventional practice.

The rake bar 10 is adapted to have a plurality of rake teeth generally designated as 12 mounted in depending position and spaced from each other longitudinally of the rake bar. Only one of such teeth 12 is shown in the drawing, as each of the others is substantially identical to that shown. For releasably mounting each tooth 12, the rake bar 10 is provided with a pair of diametrically opposed openings or slots 11.

To facilitate description of the invention and the various components thereof, terms having currency in the art will be used. However, as used in this description, "tooth" and "tine" are distinguished. "Tooth" is that entire structure 12 which is releasably secured to the rake bar 10. "Tine" is used to define generally that elongated metal component 26 which depends from the rake bar 10 and comprises a portion of the "tooth." Restated, the "tine" is a part of the "tooth." The tooth 12 comprises a connector, generally designated as 13, and the tine 26.

The connector 13 comprises a clip 29 and yieldable or flexible block or body 25. The clip 29 has the general shape of a "J" rotated 90°. Said clip 29 has a curved upper or side portion or leg 14 and a lower flat portion or leg 15. A curved medial portion 16 is integral with said side and lower portions 14 and 15. As illustrated in FIG. 2, lower clip portion 15 may have a lobate configuration.

The inner surface 17 of the clip leg 14 is concave with a radius of curvature which is substantially the same as the outer surface 18 of the rake bar 10 along which said upper leg snugly engages. The upper leg 14 has an aperture 19 which is in alignment and registers with the apertures 11 in the rake bar 10 to accommodate a bolt 20 the head 21 of which bears against the outer surface 22 of the clip leg or portion 14. The opposite end of the bolt is threaded as at 23 to accommodate a nut 24 by which the tooth clip 29 is releasably secured to the rake bar 10.

As illustrated in the drawings in FIGS. 1 and 2, the lower clip leg 15 has an integral lip 27 which extends outwardly beyond the rake bar 10. The inner upper surface 28 of the block 25 is bonded or molded to a continuous outer or partially convex under surface area of the lower leg 15 and medial portion of the J-shaped clip 29 in any conventional fashion such as vulcanization. The J-shaped clip 29 may be of conventional metallic fabrication, and the block 25 is fabricated of a suitable rubber or other elastomer material which will yield under normal usage.

Having reference to FIG. 2, it is observed that the body 25 comprises a plurality of ribs or areas of thickening or scallops 30 which extend longitudinally of the body and radiate outwardly and upwardly from the aperture or opening 31 formed in the lower end of the body.

The aperture or hole 31 provides the opening to the exterior for a well or deep cavity 32 which is disposed substantially medially of the body 25 and extends longitudinally thereof from the bottom thereof to substantially the junction of said body 25 with the lower leg 15 of the J-shaped clip.

A fitting or what also will be referred to as a permanent tine portion, tine connector or sleeve 33 is bonded or molded into the body 25. The tine connector 33 is of tube-like construction, having an elongated bore 34 of preferably a uniform diameter which extends longitudinally of the cavity or well 32. The fitting or tine connector 33 is mounted in the well or hole 32, but the upper end of said tine connector 33 is spaced from the lower end portion of the leg 15 of the J-shaped clip 29 to provide an air pocket 35 the purpose of which will hereinafter become apparent.

The wall of the tube or tine connector 33 has or provides a plurality of annular external ribs, projections, bosses or lugs 36, only some of which have been numbered in the drawings. The lugs 36 may be vertically spaced and have disposed therebetween grooves 37. The lugs 36 are embedded in block 25 and provide means by which the tube or tine connector 33 is anchored in the body 25 to the fabric of which said tube or tine connector is bonded by any suitable means.

The lower end portion 38 of the tube or tine connector 33 comprises an annular shoulder 39 and a depending nipple 40. The shoulder 39 is imbedded in the lower end portion of the elastomer block or body 25. The nipple 40 extends outwardly and downwardly from the block or body 25. The nipple 40 is externally threaded, as illustrated in FIG. 1.

The lower portion 38 of the tube or tine connector 33 has a pair of diametrically opposed slots 41 which extend longitudinally of said tube 33 from the shoulder 39 through the lower end of the nipple 40. Because of the slots 41, portions of the threaded nipple 40 separated thereby can be forced together by a nut 42 threadingly mounted on said nipple 40. The nut 42 may have a slightly tapered inner diameter 43 narrowing as it extends downwardly, whereby the split portions of the nipple 40 may be gradually and easily pinched toward each other as the nut 42 is turned upwardly on the threads of the nipple 40.

The tine 26 heretofore identified is of conventional metallic fabrication. Said tine 26 comprises an inner end anchor portion 44 which is releasably insertable in the bore 34 of the tube or tine connector 33, a medial or body portion 45 and an end or offset working portion 46 which is offset in a conventional fashion for a side-delivery rake tine. The tine 26 may be fabricated of conventional metal composition, and the diameter thereof is substantially the same as the diameter of the bore 34.

At the junction between the inner portion 44 with the body of the tine 45, there are provided a pair of integral upsets, lugs or bosses 47 which extend outwardly from the tine 26 in diametrically opposed positions. The transverse dimension of the lugs, bosses or upsets 47 is sufficiently small to provide for sliding thereof in the slots 41 however, without a substantial amount of play.

It is apparent now that the slots 41 provide a means for replaceably or releasably mounting the tines 26 in the tube or connector 33. When the tine 26 has been moved to the position illustrated in FIG. 1, and the nut 42 threaded upwardly on the nipple 40, the lugs 47 which are disposed above nut 42 are also impinged by nipple 40, whereby the tine 26 is secured in body or block 25. When it is desired to release the tine 26, the nut 42 is rotated to unthread it from the nipple 40, whereby the tine 26 is freed and can be removed from the sleeve or connector 33 by withdrawal of said tine 26 downwardly.

From the foregoing, it is apparent that a rake tooth has been provided the tine of which is replaceable. It is further observed that the portions of the tooth which connect the tine to the rake bar may be repeatedly used together with successive tines. Thereby, as individual tines wear out, only tine portions need be replaced. The foregoing construction provides for substantial improvement over conventional devices in that as a tine would wear because of its connection to the remainder of the tooth, it was necessary to replace an entire tooth or a greater portion thereof than merely the tine. Additionally, improved tine flexibility results because of the provision of air pocket 35.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. The combination in a rake tooth of an elastomer body and a tine depending from said body with means for releasably securing said tine to said body in which said means for releasably securing said tine to said body comprises a tube-like structure mounted in said body and means for releasably securing said tine in said tube-like structure and in which said means for releasably securing said tine in said tube-like structure comprises an extension of said tube-like structure extending outwardly from said body, and a lock releasably mounted on said extension releasably to hold said tine in said tube-like structure.

2. The device defined in claim 1 in which said extension has guide means, and lugs on said tine releasably disposed in said guide means.

3. The device defined in claim 2 in which said guide means comprise opposed slots.

4. The rake tooth defined in claim 1 further characterized by said body having an air pocket disposed inwardly of the inner end of said tine.

References Cited by the Examiner

UNITED STATES PATENTS

| | | | |
|---|---|---|---|
| 224,251 | 2/1880 | Tyler | 145—61 |
| 1,002,158 | 8/1911 | Konigsberg et al. | 145—61 X |
| 1,230,561 | 6/1917 | Chige | 145—61 X |
| 1,304,942 | 5/1919 | Calnan | 56—400.21 X |
| 2,054,129 | 9/1936 | Kelsey | 172—96 |
| 2,583,767 | 1/1952 | Daignas. | |
| 3,096,609 | 7/1963 | Garrett et al. | 56—400 |
| 3,157,019 | 11/1964 | Brackbill | 56—400 |

ABRAHAM G. STONE, *Primary Examiner.*

RUSSELL R. KINSEY, *Examiner.*

M. C. PAYDEN, *Assistant Examiner.*